(12) United States Patent
Kobayashi (10) Patent No.: US 9,280,308 B2
(45) Date of Patent: Mar. 8, 2016

(54) THREE-DIMENSIONAL OBJECT PREVIEW DEVICE, THREE-DIMENSIONAL PRINTING APPARATUS, AND THREE-DIMENSIONAL OBJECT PREVIEW METHOD

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 14/598,250

(22) Filed: Jan. 16, 2015

(65) Prior Publication Data

US 2015/0205553 A1    Jul. 23, 2015

(30) Foreign Application Priority Data

Jan. 20, 2014   (JP) ................................ 2014-007711

(51) Int. Cl.
| | |
|---|---|
| *G06F 3/12* | (2006.01) |
| *B29C 67/00* | (2006.01) |
| *B33Y 10/00* | (2015.01) |
| *B33Y 30/00* | (2015.01) |
| *B33Y 50/00* | (2015.01) |

(52) U.S. Cl.
CPC .......... *G06F 3/1256* (2013.01); *B29C 67/0059* (2013.01); *B29C 67/0088* (2013.01); *B29C 67/0092* (2013.01); *B33Y 10/00* (2014.12); *B33Y 30/00* (2014.12); *B33Y 50/00* (2014.12); *G06F 3/1208* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0161469 | A1* | 10/2002 | Faulkner et al. | ............... 700/118 |
| 2015/0045928 | A1* | 2/2015 | Perez et al. | ................... 700/110 |
| 2015/0057780 | A1* | 2/2015 | Liu et al. | ......................... 700/98 |

FOREIGN PATENT DOCUMENTS

JP            02-130132  A        5/1990

\* cited by examiner

*Primary Examiner* — Mohammad Ghayour
*Assistant Examiner* — Christopher D Wait
(74) *Attorney, Agent, or Firm* — Keating and Bennett, LLP (57) ABSTRACT

A three-dimensional object preview device includes a cross-sectional image data generation section configured to generate cross-sectional image data representing a cross-sectional shape of each layer of a three-dimensional object, a two-dimensional coordinate data acquisition section configured to acquire first two-dimensional coordinate data from the cross-sectional image data, a two-dimensional coordinate data conversion section configured to convert, using triangulation, the first two-dimensional coordinate data into second two-dimensional coordinate data, a three-dimensional coordinate data generation section configured to add Z-axis coordinate information to the second two-dimensional coordinate data to generate three-dimensional coordinate data, a layer image data generation section configured to add layer thickness information to the three-dimensional coordinate data, thus generating layer image data, a printing image data generation section configured to generate, using the layer image data, printing image data representing a three-dimensional model, and a display section configured to cause a display device to display the three-dimensional model.

15 Claims, 7 Drawing Sheets

THREE-DIMENSIONAL OBJECT PREVIEW DEVICE, THREE-DIMENSIONAL PRINTING APPARATUS, AND THREE-DIMENSIONAL OBJECT PREVIEW METHOD

This application claims priority to Patent Application No. 2014-7711 filed in Japan on Jan. 20, 2014, the entire contents of which are hereby incorporated by reference.

BACKGROUND OF THE INVENTION

1. Field of the Invention

The present invention relates to three-dimensional object preview devices, three-dimensional printing apparatuses, and three-dimensional object preview methods.

2. Description of the Related Art

A three-dimensional object is formed, as is known in the art, using three-dimensional data representing a shape of the three-dimensional object. Such a technique is disclosed in JP 02-130132 A, for example.

A three-dimensional printing apparatus disclosed in JP 02-130132 A includes a discharge nozzle from which liquid photo-curable resin is discharged. This discharge nozzle is movable along X, Y, and Z axes of an XYZ rectangular coordinate system. The photo-curable resin discharged from the discharge nozzle is exposed to light. The photo-curable resin exposed to light is cured to form cured layers. These cured layers are stacked one on top of another, thus forming a three-dimensional object.

Such cured layers are formed in accordance with cross-sectional image data. The term "cross-sectional image data" refers to data representing a cross-sectional shape obtained by dividing a three-dimensional object at a predetermined interval along the Z-axis. Note that cross-sectional image data represents a cross-sectional shape parallel to an XY plane. A plurality of pieces of cross-sectional image data are generated from a single piece of three-dimensional data representing a shape of a three-dimensional object.

Figure 6:
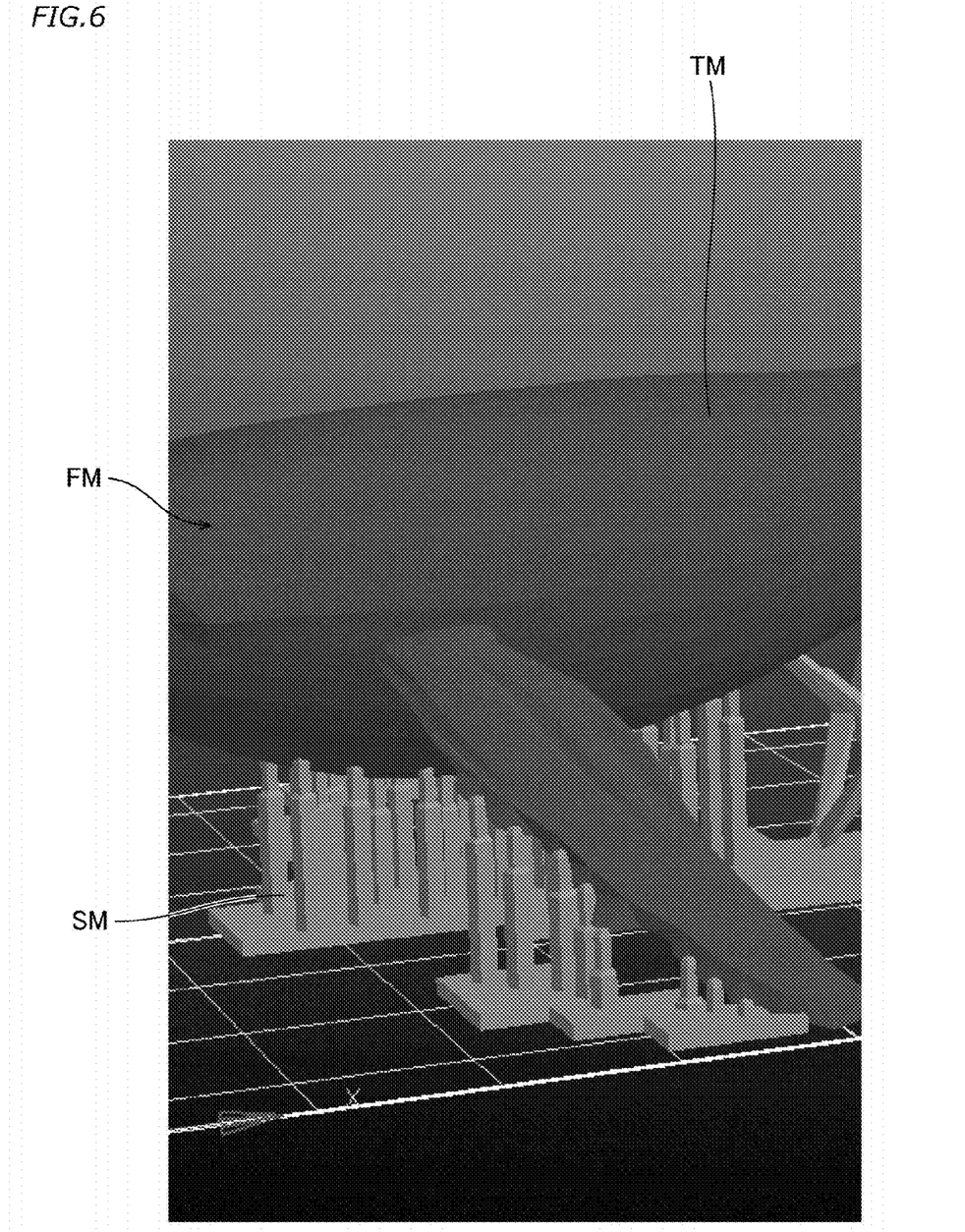
FIG. 6 illustrates an example of a displayed three-dimensional model for an entire three-dimensional object.

A three-dimensional object can partially deform under its own weight while being formed. To prevent such deformation and accurately form a three-dimensional object, a support structure arranged to support the target object is three-dimensionally printed in some cases for a three-dimensional object (hereinafter referred to as a "target object"). Such a support structure will hereinafter be referred to as a "support object". A combination of a target object and a support object will hereinafter be referred to as a "full object". FIG. 6 illustrates an example of a target model TM serving as a three-dimensional model for a target object, an example of a support model SM serving as a three-dimensional model for a support object, and an example of a full model FM serving as a three-dimensional model for a full object.

A three-dimensional object is formed using a three-dimensional printing apparatus as follows. First, three-dimensional data of a full object is generated using three-dimensional data of a target object and data of a support object which supports the target object during forming the three-dimensional object. Then, a computation is performed to generate a plurality of pieces of cross-sectional image data from the three-dimensional data of the full object. If the target object has a complicated shape, an error or miscomputation, for example, can occur during the computation, resulting in a defect in the generated cross-sectional image data, e.g., a partial loss of the cross-sectional image data.

Unfortunately, there is no method known in the art that enables an operator to determine a defect in cross-sectional image data before actually starting to form a three-dimensional object. The only way known in the art to determine a defect in cross-sectional image data is to observe a three-dimensional object that has ended up being formed unsuccessfully. Consequently, an operator has to correct defective cross-sectional image data after a three-dimensional object has actually been formed, which means that such a correction has to be made repeatedly each time a three-dimensional object is formed.

A three-dimensional object is formed by stacked cured layers, and thus has steps between the cured layers adjacent to each other. When such steps are small, a three-dimensional object has a smooth surface, but when such steps are large, a three-dimensional object has a rough surface. Unfortunately, no technique known in the art allows an operator to find how smooth the surface of a three-dimensional object is until the three-dimensional object is actually formed. Thus, in some cases, the surface of a three-dimensional object, which has actually been formed, is not as smooth as an operator has expected.

For example, the surface of a three-dimensional object may be satisfactorily smoothed by reducing thicknesses of cured layers. This, however, makes forming of the three-dimensional object time-consuming. To overcome such a problem, thicknesses of cured layers are preferably determined so as to minimize the time required to form a three-dimensional object while keeping a surface of the three-dimensional object smooth enough to satisfy a required smoothness level of the three-dimensional object.

A useful solution is to use cross-sectional image data so as to enable an operator to preview an actual image of a three-dimensional model that represents a shape of a three-dimensional object which is going to be actually formed. Such a solution enables the operator to, for example, adjust thicknesses of cured layers, which affect the surface smoothness of the three-dimensional object, or correct defective cross-sectional image data while observing the formed image of the three-dimensional model in advance. Consequently, the three-dimensional object is easily formed as desired.

SUMMARY OF THE INVENTION

Accordingly, preferred embodiments of the present invention provide a three-dimensional object preview device that enables, before a three-dimensional object is formed, display of a three-dimensional model representing a shape of the three-dimensional object to be actually formed, and a three-dimensional printing apparatus including the three-dimensional object preview device.

A three-dimensional object preview device according to a preferred embodiment of the present invention causes a display device to display a three-dimensional object before the three-dimensional object is printed. The three-dimensional object is printed by sequentially stacking layers of the three-dimensional object along a Z-axis. The three-dimensional object preview device preferably includes a cross-sectional image data generation section; a two-dimensional coordinate data acquisition section; a two-dimensional coordinate data conversion section; a three-dimensional coordinate data generation section; a layer image data generation section; a printing image data generation section; and a display section. The cross-sectional image data generation section is configured to divide the three-dimensional object whose shape is represented by initial three-dimensional data into a plurality of layers continuous along the Z-axis, thus generating cross-sectional image data representing a cross-sectional shape of each layer of the three-dimensional object. The two-dimensional coordinate data acquisition section is configured to acquire first two-dimensional coordinate data from the cross-sectional image data of each layer of the three-dimensional object. The first two-dimensional coordinate data is defined by coordinates of X and Y axes each perpendicular to the Z-axis. The two-dimensional coordinate data conversion section is configured to convert, using triangulation, the first two-dimensional coordinate data into second two-dimensional coordinate data of each layer of the three-dimensional object. The second two-dimensional coordinate data includes a plurality of triangles. The three-dimensional coordinate data generation section is configured to add Z-axis coordinate information to the second two-dimensional coordinate data of each layer of the three-dimensional object, thus generating three-dimensional coordinate data of each layer of the three-dimensional object. The layer image data generation section is configured to add layer thickness information to the three-dimensional coordinate data of each layer of the three-dimensional object, thus generating layer image data representing a three-dimensional model for each layer of the three-dimensional object. The printing image data generation section is configured to generate, using the layer image data of each layer of the three-dimensional object, printing image data representing a three-dimensional model for a portion or an entirety of the three-dimensional object. The display section is configured to cause the display device to display the three-dimensional model represented by the printing image data.

Various preferred embodiments of the present invention enable, before beginning to form a three-dimensional object, display of a three-dimensional model representing a shape of the three-dimensional object to be actually formed. This enables an operator to, for example, adjust layer thicknesses so that the three-dimensional object has a desired surface smoothness or correct defective cross-sectional image data while observing the three-dimensional model. Consequently, the three-dimensional object is easily formed as desired.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A three-dimensional object preview device, a three-dimensional printing apparatus, and a three-dimensional object preview method according to preferred embodiments of the present invention will now be described in detail with reference to the accompanying drawings. The terms "right", "left", "up", and "down" in the following description respectively refer to right, left, up, and down with respect to an operator (not illustrated) in front of a three-dimensional printing apparatus 10 illustrated in FIG. 1. The term "forward" refers to a direction from the rear of the three-dimensional printing apparatus 10 toward the front of the three-dimensional printing apparatus 10. The term "rearward" refers to a direction from the front of the three-dimensional printing apparatus 10 toward the rear of the three-dimensional printing apparatus 10. The reference signs "F", "Re", "R", "L", "U", and "D" in the drawings respectively refer to front, rear, right, left, up, and down. It is to be noted that these definitions are given merely to aid the understanding of the description, and that they are, in no way, to be construed as limiting the scope of the present invention.

Figure 1:
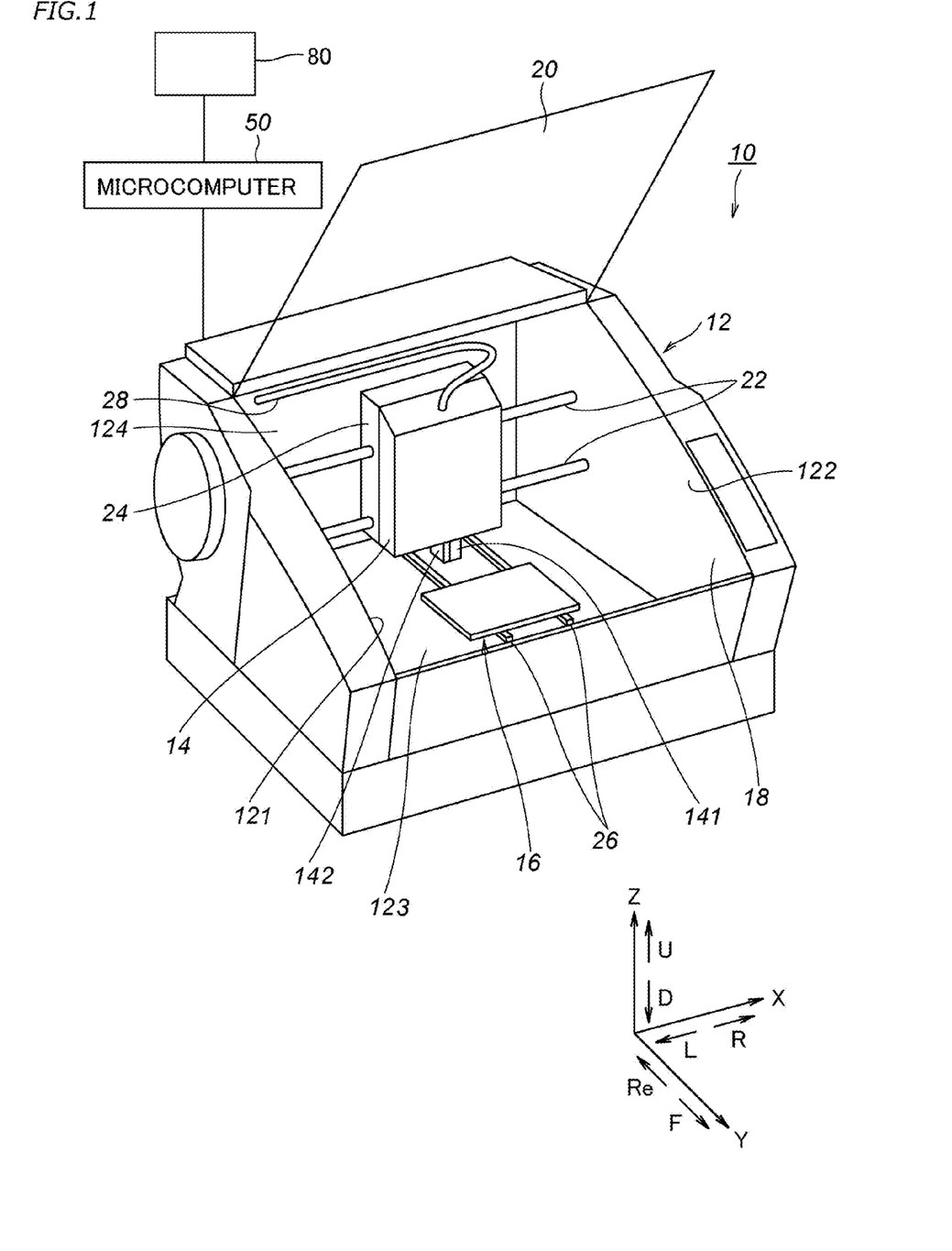
FIG. 1 is a perspective view of a three-dimensional printing apparatus.

As illustrated in FIG. 1, the three-dimensional printing apparatus 10 preferably includes an enclosure 12, a table 16, and a discharge head 14 arranged to discharge photo-curable resin onto the table 16 and cure the discharged photo-curable resin. The three-dimensional printing apparatus 10 is connected to a microcomputer 50. The microcomputer 50 is preferably built into the three-dimensional printing apparatus 10 in the present preferred embodiment. The microcomputer 50 is connected with a display device 80. The microcomputer 50 is configured or programmed to define and function as the three-dimensional object preview device in the present preferred embodiment.

The enclosure 12 is provided with an opening 18. The opening 18 is covered with a transparent cover 20. The cover 20 is configured to be openable and closable. The operator opens the cover 20 when removing a three-dimensional object formed on the table 16, and closes the cover 20 when forming a three-dimensional object.

A pair of guide rails 22 are disposed inside the enclosure 12. The guide rails 22 are fixed to side walls 121 and 122 of the enclosure 12. A movable member 24 is configured to be movable along the guide rails 22. The discharge head 14 is attached to the movable member 24. The discharge head 14 is configured to be movable along a Z-axis of an XYZ rectangular coordinate system. More specifically, the movable member 24 is provided with a guide rail (not illustrated) extending along the Z-axis, and the discharge head 14 is secured to this guide rail so as to be movable along the Z-axis. Upon activation of a motor (not illustrated) for the discharge head 14 under control of the microcomputer 50, the discharge head 14 moves along the guide rail extending along the Z-axis. In other words, the discharge head 14 moves up or down.

The movable member 24 is configured to be movable along the guide rails 22 extending along an X-axis. Upon activation of a motor (not illustrated) for the movable member 24 under control of the microcomputer 50, the movable member 24 moves along the X-axis. In other words, the movable member 24 moves rightward or leftward. The discharge head 14 is also movable along the X-axis together with the movable member 24, because the discharge head 14 is attached to the movable member 24.

A tank (not illustrated) configured to store photo-curable resin is provided inside a rear wall 124 of the enclosure 12. This tank and the discharge head 14 are connected to each other through a tube 28. Thus, the photo-curable resin is supplied from the tank to the discharge head 14 through the tube 28. The discharge head 14 preferably includes a nozzle head 141. The nozzle head 141 discharges the photo-curable resin. The discharge head 14 preferably further includes a light application head 142 arranged to apply light to the photo-curable resin discharged from the nozzle head 141 and thus cure the photo-curable resin. Immediately after being discharged from the nozzle head 141 of the discharge head 14, the photo-curable resin is exposed to the light from the light application head 142 and thus cured.

Under control of the microcomputer 50, the discharge head 14 operates as follows in accordance with cross-sectional image data (which will be described below). With the discharge head 14 moving along the X-axis and Z-axis, the nozzle head 141 discharges the photo-curable resin, and the light application head 142 applies light to the photo-curable resin discharged from the nozzle head 141, thus curing the discharged photo-curable resin.

The enclosure 12 preferably includes a bottom plate 123. The bottom plate 123 is provided with a pair of guide rails 26 extending along a Y-axis. The table 16 is movably arranged on the guide rails 26. A motor (not illustrated) is provided for the table 16. Upon activation of this motor under control of the microcomputer 50, the table 16 moves along the guide rails 26 extending along the Y-axis. In other words, the table 16 moves forward or rearward.

Thus, the discharge head 14 is movable along the X-axis and Z-axis, and the table 16 is movable along the Y-axis. Consequently, the discharge head 14 is movable relative to the table 16 along the X-axis, Y-axis, and Z-axis. The guide rails 22, the movable member 24, the motor for the movable member 24, the guide rail of the movable member 24, the motor for the discharge head 14, the guide rails 26, the table 16, and the motor for the table 16 define and function as an example of a mover arranged to move the discharge head 14 relative to the table 16 along the X-axis, Y-axis, and Z-axis.

Figure 2:
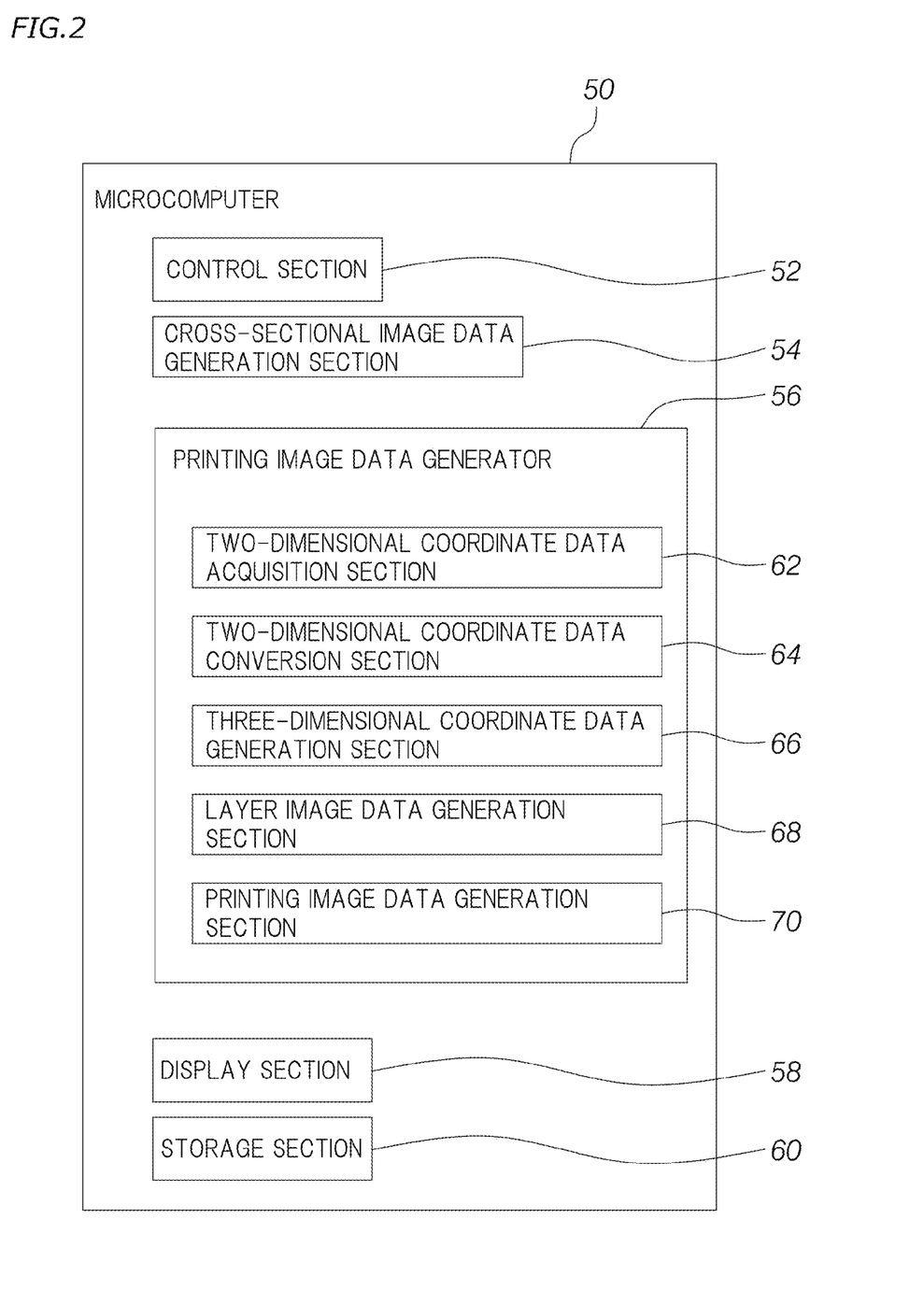
FIG. 2 is a functional block diagram of a microcomputer.

The microcomputer 50 is configured or programmed to control all operations of the three-dimensional printing apparatus 10. The microcomputer 50 generates data, such as cross-sectional image data necessary to form a three-dimensional object, and printing image data used to display, on the display device 80, an image of a three-dimensional model for the three-dimensional object. The microcomputer 50 preferably includes a processor, such as a central processing unit (CPU), and memories, such as a read-only memory (ROM) and a random-access memory (RAM), for example. The microcomputer 50 is configured or programmed to perform functions that will be described below. FIG. 2 is a functional block diagram of the microcomputer 50. The microcomputer 50 preferably is configured or programmed to include a control section 52, a cross-sectional image data generation section 54, a printing image data generator 56, a display section 58, and a storage section 60. The control section 52 includes a CPU, for example. The storage section 60 includes a memory, for example. When the control section 52 includes a CPU, the CPU is configured to execute a program stored in a RAM (not illustrated), thus enabling the cross-sectional image data generation section 54, the printing image data generator 56, and the display section 58 to perform their functions.

The control section 52 is configured or programmed to control all operations of the three-dimensional printing apparatus 10. The control section 52 activates the motors, for example, to control the movement of the movable member 24 along the X-axis, the movement of the discharge head 14 along the Z-axis, and the movement of the table 16 along the Y-axis.

The cross-sectional image data generation section 54 generates, from initial three-dimensional data representing a shape of a three-dimensional object, cross-sectional image data necessary for the three-dimensional printing apparatus 10 to form the three-dimensional object. As described in "BACKGROUND OF THE INVENTION", the three-dimensional object may be a full object including a target object and a support object. In such a case, the cross-sectional image data generation section 54 performs a computation using initial three-dimensional data of the target object, thus generating initial three-dimensional data of the support object. The cross-sectional image data generation section then generates initial three-dimensional data of the full object in accordance with the initial three-dimensional data of the target object, and the initial three-dimensional data of the support object. Any of various known methods may be used to generate the initial three-dimensional data of the support object using the initial three-dimensional data of the target object, and the details thereof will not be described.

The cross-sectional image data generation section 54 generates cross-sectional image data by using the initial three-dimensional data of the full object. Specifically, the cross-sectional image data generation section 54 divides a three-dimensional model, which is determined by the initial three-dimensional data of the full object, into cross-sectional shapes parallel or substantially parallel to an XY plane at a predetermined interval along the Z-axis. Thus, the cross-sectional image data generation section 54 generates a plurality of pieces of cross-sectional image data representing cross-sectional shapes continuous along the Z-axis.

The three-dimensional model may be divided at a predetermined regular interval along the Z-axis. The operator may set the interval using a parameter such as a "layer pitch". The layer pitch is not limited to any particular value. For example, the layer pitch may range from about 0.1 mm to about 0.15 mm, for example. Layer symbols, for example, are assigned to these pieces of cross-sectional image data in ascending order of their Z-axis coordinate values. Supposing that the Z-axis coordinate values are 0, $Z_1$, $Z_2$, $Z_3$, . . . , $Z_{n-1}$ where n is a positive integer, the cross-sectional image data with the coordinate value "0" is defined as a first layer, the cross-sectional image data with the coordinate value "$Z_1$" is defined as a second layer, the cross-sectional image data with the coordinate value "$Z_2$" is defined as a third layer, the cross-sectional image data with the coordinate value "$Z_3$" is defined as a fourth layer, and the cross-sectional image data with the coordinate value "$Z_{n-1}$" is defined as an nth layer (last layer).

How the cross-sectional image data generation section 54 generates cross-sectional image data is not limited to any particular method. Any of various known methods may be used to generate cross-sectional image data.

The printing image data generator 56 generates printing image data by using the cross-sectional image data generated by the cross-sectional image data generation section 54. The printing image data generator 56 preferably includes a two-dimensional coordinate data acquisition section 62; a two-dimensional coordinate data conversion section 64; a three-dimensional coordinate data generation section 66; a layer image data generation section 68; and a printing image data generation section 70.

The two-dimensional coordinate data acquisition section 62 acquires first two-dimensional coordinate data from the cross-sectional image data of each layer of the object, which has been generated by the cross-sectional image data generation section 54. The first two-dimensional coordinate data is defined by X-axis and Y-axis coordinates.

Using triangulation, the two-dimensional coordinate data conversion section 64 converts the first two-dimensional coordinate data of each layer of the object, which has been acquired by the two-dimensional coordinate data acquisition section 62, into second two-dimensional coordinate data including a plurality of triangles. A specific method of triangulation used by the two-dimensional coordinate data conversion section 64 is not limited to any particular method. The two-dimensional coordinate data conversion section 64 may use Delaunay triangulation, for example.

The three-dimensional coordinate data generation section 66 adds height information (i.e., Z-axis coordinate information) to the second two-dimensional coordinate data of each layer of the object, which has been obtained by the two-dimensional coordinate data conversion section 64, thus generating three-dimensional coordinate data of each layer of the object.

The layer image data generation section 68 adds layer thickness information (i.e., information on a layer length along the Z-axis) to the three-dimensional coordinate data of each layer of the object, which has been generated by the three-dimensional coordinate data generation section 66, thus generating layer image data representing a three-dimensional model for each layer of the object. Layer symbols identical to those assigned to the cross-sectional image data are assigned to the layer image data of the corresponding layers. For example, the layer symbol "i" is assigned to the layer image data of an ith layer. The layer image data of the ith layer represents a shape obtained by extending a cross-sectional shape of the ith layer along the Z-axis by a layer thickness (or layer pitch).

The printing image data generation section 70 generates printing image data, representing a three-dimensional model for a portion or an entirety of the three-dimensional object, by using the layer image data of each layer of the object, which has been generated by the layer image data generation section 68. The printing image data generation section 70 generates the printing image data in response to an instruction provided from the operator.

For example, upon receiving from the operator an instruction to display the whole three-dimensional object, the printing image data generation section 70 sequentially stacks the layer image data from the first layer to the last layer, thus generating printing image data. Using this printing image data, the display section 58 causes the display device 80 to display an image of a three-dimensional model representing a shape of the whole three-dimensional object.

For example, upon receiving from the operator an instruction to display a single specific layer of the three-dimensional object, the printing image data generation section 70 generates printing image data by using the layer image data of the layer specified by the operator. Using this printing image data, the display section 58 causes the display device 80 to display an image of a three-dimensional model representing a shape of this layer.

For example, upon receiving from the operator an instruction to display continuous layers of the three-dimensional object, the printing image data generation section 70 sequentially stacks the layer image data of the continuous layers specified by the operator, thus generating printing image data. Using this printing image data, the display section 58 causes the display device 80 to display an image of a three-dimensional model representing shapes of the continuous layers.

The display section 58 causes the display device 80 to display the three-dimensional model represented by the printing image data, which has been generated by the printing image data generation section 70. The display section 58 may cause the display device 80 to selectively display one of the three-dimensional model represented by the printing image data, and the three-dimensional model represented by the initial three-dimensional data. The display section 58 may cause the display device 80 to display, side by side, the three-dimensional model represented by the printing image data, and the three-dimensional model represented by the initial three-dimensional data.

The storage section 60 stores various data including cross-sectional image data, layer image data, and printing image data.

The display device 80 displays an image. The display device 80 is not limited to any particular type of display device. For example, a liquid crystal display or a CRT display may be used as the display device 80. The display device 80 may be separate from or integrated with the three-dimensional printing apparatus 10.

Next, the three-dimensional object preview method and three-dimensional object forming method according to preferred embodiments of the present invention will be described. In forming a three-dimensional object using the three-dimensional printing apparatus 10, the operator first enters into the microcomputer 50 initial three-dimensional data, which is data of a three-dimensional model representing a shape of a three-dimensional object to be formed. Then, the operator operates, for example, an operating element (not illustrated), such as an operating button, thus providing an instruction to generate cross-sectional image data. Upon receiving the instruction to generate cross-sectional image data, the microcomputer 50 starts an image data generation process, which will be described below.

Figure 3:
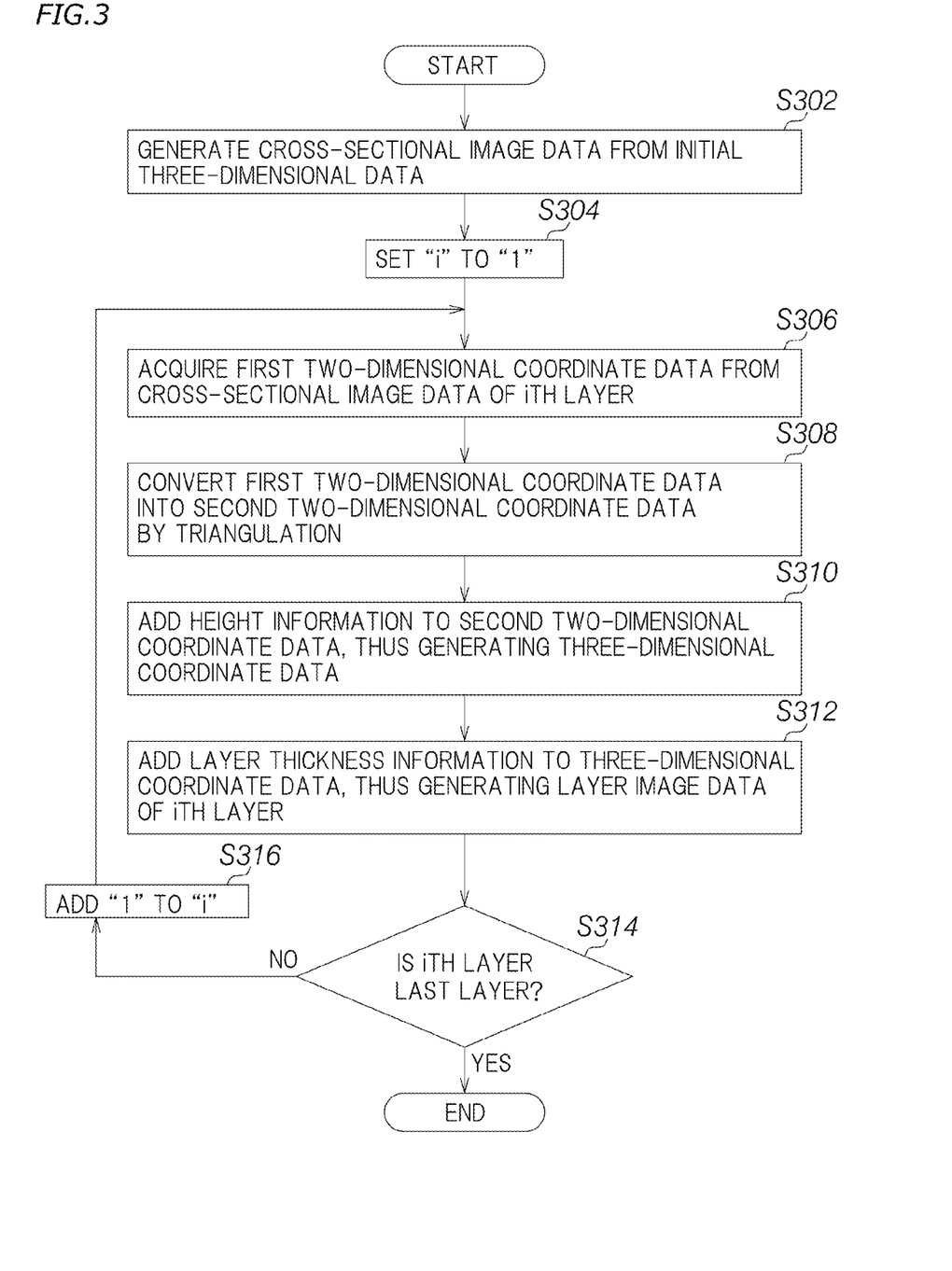
FIG. 3 is a flowchart of an image data generation process.

FIG. 3 illustrates details of the image data generation process. First, cross-sectional image data of a full object is generated from initial three-dimensional data of a target object, which has been entered into the microcomputer 50 (Step S302).

In Step S302, the cross-sectional image data generation section 54 first performs a computation using the entered initial three-dimensional data of the target object, thus generating initial three-dimensional data of a support object. Then, the cross-sectional image data generation section 54 generates initial three-dimensional data of the full object using the initial three-dimensional data of the target object, and the initial three-dimensional data of the support object. Subsequently, the cross-sectional image data generation section 54 divides a three-dimensional model, represented by the initial three-dimensional data of the full object, at a predetermined interval along the Z-axis, thus generating cross-sectional image data. In this case, layer symbols are assigned to the cross-sectional image data in ascending order of their Z-axis coordinate values as mentioned above. The cross-sectional image data generated in this manner is sent to and stored in the storage section 60.

Following the generation of the cross-sectional image data, "i", which is the layer symbol of the cross-sectional image data, is set to "1" (Step S304), and then first two-dimensional coordinate data is acquired from the cross-sectional image data of the ith layer (Step S306). More specifically, in Step S304, the two-dimensional coordinate data acquisition section 62 sets "i", which is the layer symbol of the cross-sectional image data, to "1". In Step S306, the two-dimensional coordinate data acquisition section 62 acquires the first two-dimensional coordinate data of the ith layer from the cross-sectional image data of the ith layer.

Following the acquisition of the first two-dimensional coordinate data of the ith layer, the acquired first two-dimensional coordinate data is converted, using triangulation, into second two-dimensional coordinate data including triangles (Step S308). More specifically, in Step S308, the two-dimensional coordinate data conversion section 64 converts the first two-dimensional coordinate data of the ith layer into the second two-dimensional coordinate data of the ith layer by triangulation.

Then, height information is added to the second two-dimensional coordinate data of the ith layer obtained in Step S308, thus generating three-dimensional coordinate data (Step S310). More specifically, in Step S310, the three-dimensional coordinate data generation section 66 adds height information, which is represented by "i×layer pitch", to the second two-dimensional coordinate data of the ith layer obtained in Step S308, thus generating the three-dimensional coordinate data of the ith layer.

Subsequently, layer thickness information is added to the three-dimensional coordinate data of the ith layer, thus generating layer image data of the ith layer (Step S312). More specifically, in Step S312, the layer image data generation section 68 adds layer thickness information (or layer pitch information) to the three-dimensional coordinate data of the ith layer, thus generating the layer image data of the ith layer. The generated layer image data of the ith layer is sent to and stored in the storage section 60.

Following the generation of the layer image data of the ith layer, the layer image data generation section 68 determines whether the ith layer is the last layer (Step S314). Upon determination in Step S314 that the ith layer is not the last layer, "1" is added to "i" (Step S316), and the process returns to Step S306. Then, Step S306 and the subsequent steps are repeated. In Step S306, the first two-dimensional coordinate data of the next layer is acquired. The image data generation process ends upon determination in Step S314 that the ith layer is the last layer.

Thus, the cross-sectional image data and layer image data of the first layer to the nth layer (last layer) are generated by the image data generation process.

Figure 4A:
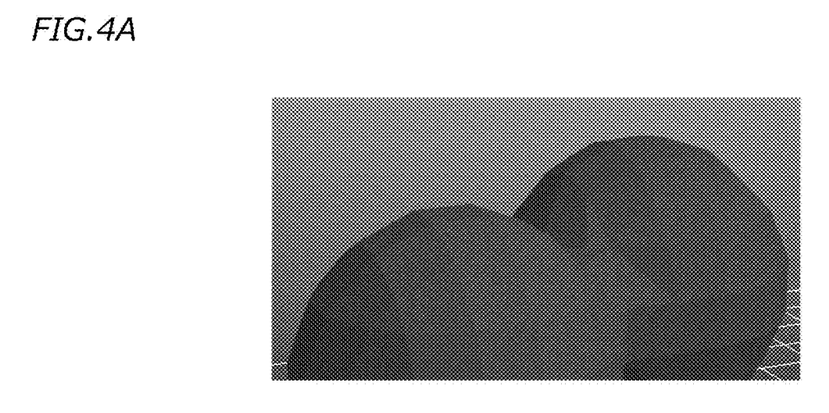
FIGS. 4A and 4B illustrate an example of a displayed three-dimensional model represented by initial three-dimensional data.
Figure 4B:
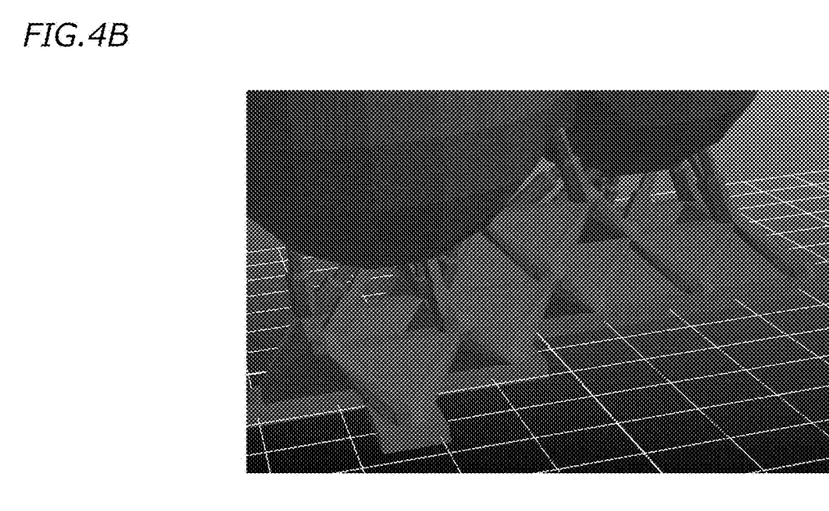
Figure 5A:
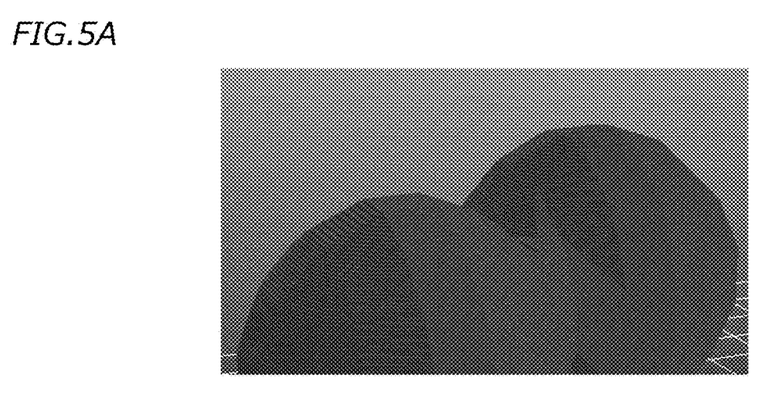
FIGS. 5A and 5B illustrate an example of a displayed three-dimensional model represented by printing image data.
Figure 5B:
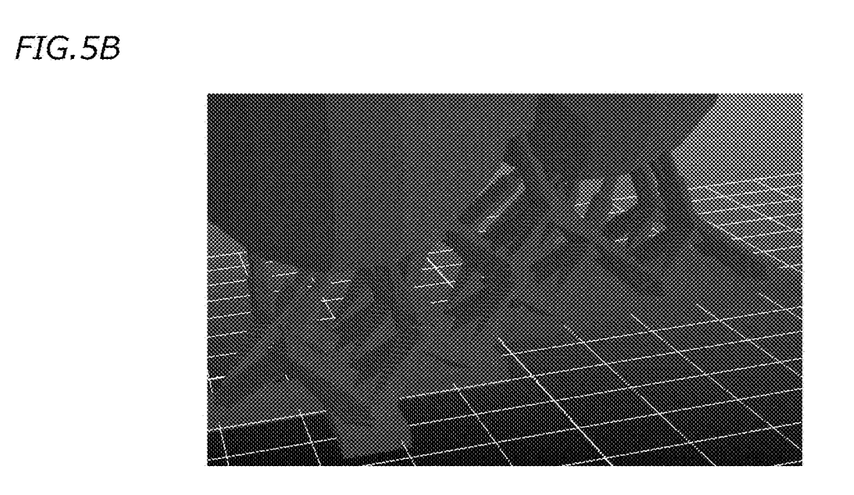

Subsequently, the operator operates an operating element (not illustrated) to provide an instruction to the display section 58, and in accordance with this instruction, the display section 58 causes the display device 80 to display an image desired by the operator. Upon receiving an instruction to display a three-dimensional model represented by initial three-dimensional data, the display section 58 causes the display device 80 to display the three-dimensional model represented by initial three-dimensional data, as illustrated in FIGS. 4A and 4B, for example. Upon receiving an instruction to display a three-dimensional model represented by printing image data, the printing image data generation section 70 generates printing image data, and the display section 58 causes, using this printing image data, the display device 80 to display the three-dimensional model represented by the printing image data. FIGS. 5A and 5B illustrate an example of the displayed three-dimensional model represented by the printing image data.

As seen from a comparison between FIGS. 4A and 5A and a comparison between FIGS. 4B and 5B, a three-dimensional model represented by printing image data usually has a rougher surface than a three-dimensional model represented by initial three-dimensional data. The surface roughness of a three-dimensional model represented by printing image data varies depending on a layer pitch mentioned above. Unlike a three-dimensional model represented by initial three-dimensional data, a three-dimensional model represented by printing image data reproduces an actual three-dimensional object accurately, which is going to be actually formed by the three-dimensional printing apparatus 10. The operator observes an image displayed on the display device 80 or specifically an image of a three-dimensional model represented by printing image data, and thus can examine, for example, surface condition or shape of the three-dimensional object, which is to be actually formed, without actually forming the three-dimensional object using the three-dimensional printing apparatus 10.

Figure 7A:
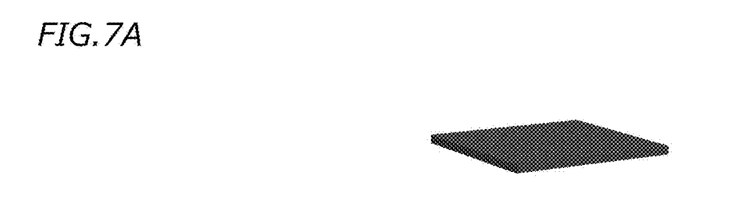
FIG. 7A illustrates an example of a displayed three-dimensional model for one layer of a three-dimensional object.
Figure 7B:
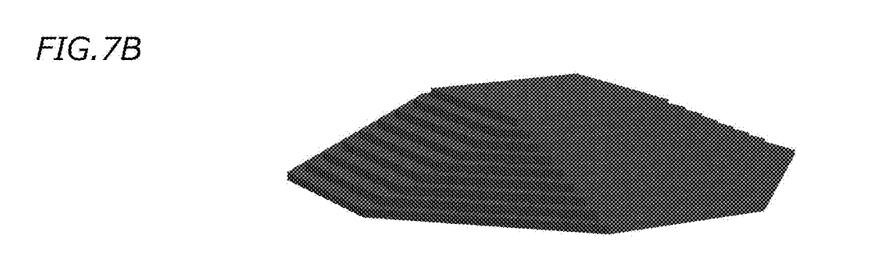
FIG. 7B illustrates an example of a displayed three-dimensional model for a plurality of layers of a three-dimensional object.

The printing image data generation section 70 generates image data of various three-dimensional models in accordance with instructions from the operator. In one example, the printing image data generation section 70 generates printing image data representing a three-dimensional model for all layers of a three-dimensional object, and the display section 58 causes, using this printing image data, the display device 80 to display the three-dimensional model for the entire three-dimensional object as illustrated in FIG. 6, for example. Note that the three-dimensional model is not entirely illustrated in FIG. 6 because FIG. 6 is a partially enlarged view of the three-dimensional model. In another example, the printing image data generation section 70 generates printing image data representing a three-dimensional model for a single layer (e.g., the nth layer) of a three-dimensional object, and the display section 58 causes, using this printing image data, the display device 80 to display the three-dimensional model for the single layer of the three-dimensional object as illustrated in FIG. 7A. In still another example, the printing image data generation section 70 generates printing image data representing a three-dimensional model for continuous layers (e.g., from the n-9th layer to the nth layer), which are included in layers of a three-dimensional object, and the display section 58 causes, using this printing image data, the display device 80 to display the three-dimensional model for the continuous layers of the three-dimensional object as illustrated in FIG. 7B.

For example, when the operator specifies no layer symbol in providing an instruction to display a three-dimensional model, the printing image data generation section 70 sequentially stacks layer image data from the first layer to the last layer, thus generating printing image data. Using this printing image data, the display section 58 then causes the display device 80 to display a three-dimensional model representing a shape of an entire three-dimensional object to be actually formed.

For example, when the operator specifies a single specific layer symbol in providing an instruction to display a three-dimensional model, the printing image data generation section 70 generates printing image data of the layer with the specified layer symbol. Using this printing image data, the display section 58 then causes the display device 80 to display a three-dimensional model representing a shape of the single specific layer of a three-dimensional object to be actually formed.

For example, when the operator specifies consecutive layer symbols in providing an instruction to display a three-dimensional model, the printing image data generation section 70 sequentially stacks layer image data with the specified consecutive layer symbols, thus generating printing image data. Using this printing image data, the display section 58 then causes the display device 80 to display a three-dimensional model including continuous layers of a three-dimensional object to be actually formed.

A three-dimensional model displayed using printing image data represents a three-dimensional object to be actually formed by the three-dimensional printing apparatus 10. This means that, for example, when cross-sectional image data is defective, a three-dimensional model displayed on the display device 80 is also defective. For example, a partial loss of cross-sectional image data leads to a partial loss of a three-dimensional model displayed on the display device 80. By observing an incomplete three-dimensional model displayed on the display device 80, the operator is able to determine defective cross-sectional image data before a three-dimensional object is actually formed.

When a three-dimensional model displayed on the display device 80 has a defective shape, the operator specifies a defective portion only, or specifies a layer symbol of a defective layer, and instructs the display device 80 to display a three-dimensional model of this defective layer only. This enables the operator to easily find a cause of the defect and correct cross-sectional image data accordingly.

When the operator, who has observed a three-dimensional model displayed on the display device 80, determines that a surface condition of a three-dimensional object is not as smooth as the operator has expected, the operator can reduce the value of a layer pitch and performs the image data generation process again, thus generating cross-sectional image data and layer image data. When the operator determines that a surface condition of a three-dimensional object may be rougher, the operator increases the value of a layer pitch and performs the image data generation process again, thus generating cross-sectional image data and layer image data.

Thus, the operator observes a three-dimensional model represented by printing image data, and corrects the three-dimensional model as desired so as to generate cross-sectional image data again. After having determined that a desired three-dimensional model is obtained, the operator operates an operating element (not illustrated) of the three-dimensional printing apparatus 10, thus providing an instruction to start forming a three-dimensional object. In response to this instruction, the control section 52 causes the discharge head 14 to discharge photo-curable resin while moving the table 16 along the Y-axis, moving the movable member 24 along the X-axis, and moving the discharge head 14 along the Z-axis in accordance with the cross-sectional image data stored in the storage section 60. Consequently, the three-dimensional object identical in shape to the three-dimensional model, which has been observed by the operator, is formed on the table 16.

As described above, the present preferred embodiment achieves the following advantageous effects. A three-dimensional model, faithfully reproducing a shape of an actual three-dimensional object to be formed by the three-dimensional printing apparatus 10, is displayed on the display device 80 by using cross-sectional image data generated from initial three-dimensional data. This enables the operator to determine what the three-dimensional object to be formed will be like, before actually forming the three-dimensional object using the three-dimensional printing apparatus 10. Consequently, the operator is allowed to determine whether cross-sectional image data is defective or examine, for example, a surface condition of the three-dimensional object without actually forming the three-dimensional object.

Accordingly, the present preferred embodiment significantly reduces the possibility that the three-dimensional printing apparatus 10 will form three-dimensional objects unsuccessfully. This means that three-dimensional objects are formed efficiently and accurately. Furthermore, the operator can form three-dimensional objects with surface roughnesses that meet the operator's expectations.

Note that the above preferred embodiment is presented by way of example only, and includes, for example, the following variations.

Variation 1

In the above preferred embodiment, the movable member 24 is preferably configured to move along the X-axis, the table 16 is configured to move along the Y-axis, and the discharge head 14 preferably is configured to move along the Z-axis. However, the movable member 24, the table 16, and the discharge head 14 are naturally not limited to these arrangements. For example, any one of the movable member 24, the table 16, and the discharge head 14 may be unmovable, because it is only required to change a relative position between the table 16 and the discharge head 14 three-dimensionally.

Variation 2

In the above preferred embodiment, initial three-dimensional data preferably is entered into the microcomputer 50 built into the three-dimensional printing apparatus 10, and the microcomputer 50 preferably is configured or programmed to generate cross-sectional image data, layer image data, and printing image data. However, a computer that is configured or programmed to generate cross-sectional image data, layer image data, and printing image data is naturally not limited to the microcomputer 50. For example, a personal computer separate from the three-dimensional printing apparatus 10 may be configured or programmed to generate cross-sectional image data, layer image data, and printing image data. In that case, this personal computer is configured or programmed to define and function as the three-dimensional object preview device. The personal computer may be communicably connected to the microcomputer 50 in a wired or wireless manner, and the cross-sectional image data, layer image data, and printing image data generated by the personal computer may be sent to the microcomputer 50.

Variation 3

In the above preferred embodiment, the three-dimensional printing apparatus 10 preferably includes the discharge head 14 three-dimensionally movable relative to the table 16, and forms a three-dimensional object on the table 16 by using photo-curable resin discharged from the discharge head 14. However, the three-dimensional printing apparatus 10 is not limited to this type of three-dimensional printing apparatus.

For example, the three-dimensional printing apparatus may be of a type that forms a three-dimensional object using an additive manufacturing process in which cured layers are sequentially lifted. This type of three-dimensional printing apparatus exposes liquid photo-curable resin to light, which is emitted from a projector and passes through a bottom surface of a tank storing the photo-curable resin. The photo-curable resin, which has been exposed to the light, forms a cured layer with a predetermined cross-sectional shape under a lower surface of a holder, or forms another cured layer with a predetermined cross-sectional shape under a lower surface of an already formed cured layer. Such cured layers are stacked downward, thus forming a three-dimensional object. Various preferred embodiments of the present invention are applicable to any three-dimensional printing apparatus that forms a three-dimensional object in accordance with cross-sectional image data of an initial three-dimensional model.

Variation 4

In the above preferred embodiment, the printing image data generation section 70 preferably is configured or programmed to generate printing image data representing a three-dimensional model for an entire three-dimensional object to be actually formed; printing image data representing a three-dimensional model for a single specific layer of a three-dimensional object to be actually formed; and printing image data representing a three-dimensional model for a plurality of continuous layers of a three-dimensional object to be actually formed. However, the printing image data generation section 70 is naturally not limited to this configuration. Alternatively, the printing image data generation section 70 may be configured to generate at least one of the three types of printing image data.

Variation 5

In the above preferred embodiment, cross-sectional image data of all layers preferably is generated, and then printing image data of each layer preferably is generated. However, cross-sectional image data and printing image data naturally do not always have to be generated in this manner. Alternatively, cross-sectional image data of a predetermined layer may be generated, and then printing image data of the predetermined layer may be subsequently generated. In other words, cross-sectional image data and printing image data may be generated layer by layer.

Variation 6

In the above preferred embodiment, cross-sectional image data preferably is generated from three-dimensional data of a full object including a support object, and then printing image data is generated using this cross-sectional image data. However, cross-sectional image data and printing image data naturally do not always have to be generated in this manner.

For example, cross-sectional image data may be generated from three-dimensional data of a target object to which no support object is added, and then printing image data may be generated using this cross-sectional image data.

The cross-sectional image data generation section 54 may be configured or programmed to generate initial three-dimensional data representing a shape of a support object from initial three-dimensional data representing a shape of a target object; divide the target object into a plurality of layers continuous along the Z-axis, thus generating cross-sectional image data representing a cross-sectional shape of each layer of the target object; and divide the support object into a plurality of layers continuous along the Z-axis, thus generating cross-sectional image data representing a cross-sectional shape of each layer of the support object.

The two-dimensional coordinate data acquisition section 62 may be configured or programmed to acquire first two-dimensional coordinate data of the target and support objects, which is defined by X-axis and Y-axis coordinates, from the cross-sectional image data of each layer of the target and support objects generated by the cross-sectional image data generation section 54.

The two-dimensional coordinate data conversion section 64 may be configured or programmed to convert, using triangulation, the first two-dimensional coordinate data of the target and support objects, which has been acquired by the two-dimensional coordinate data acquisition section 62, into second two-dimensional coordinate data of the target and support objects, including a plurality of triangles.

The three-dimensional coordinate data generation section 66 may be configured or programmed to add Z-axis coordinate information to the second two-dimensional coordinate data of each layer of the target and support objects obtained by the two-dimensional coordinate data conversion section 64, thus generating three-dimensional coordinate data of each layer of the target and support objects.

The layer image data generation section 68 may be configured or programmed to add layer thickness information to the three-dimensional coordinate data of each layer of the target and support objects generated by the three-dimensional coordinate data generation section 66, thus generating layer image data representing a three-dimensional model for each layer of the target and support objects.

The printing image data generation section 70 may be configured or programmed to generate, using the layer image data of each layer of the target and support objects generated by the layer image data generation section 68, printing image data representing a three-dimensional model for a portion or an entirety of the target object, and a three-dimensional model for a portion or an entirety of the support object.

The display section 58 may be configured or programmed to cause, using the printing image data generated by the printing image data generation section 70, the display device 80 to selectively display one of the three-dimensional model for a portion or an entirety of the target object, and the three-dimensional model for a portion or an entirety of the support object. For example, when the operator operates an operating element (not illustrated) to provide an instruction to display a three-dimensional model for a full object, the three-dimensional model for the full object (including target and support objects) is displayed on the display device 80. In contrast, when the operator provides an instruction to display a three-dimensional model for a target object, the three-dimensional model for the target object is displayed on the display device 80.

Variation 7

Any combination of the above preferred embodiment and Variations 1 to 6 may be used as appropriate.

The terms and expressions that have been employed are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of illustrative embodiments are described herein with the understanding that the present disclosure is to be considered as providing examples of the principles of the present invention and that such examples are not intended to limit the present invention to preferred embodiments described herein or illustrated herein. Hence, the present invention is not limited to the preferred embodiments described herein. The present invention includes any and all preferred embodiments including equivalent elements, modifications, omissions, combinations, adaptations or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional object preview device that causes a display device to display a three-dimensional object before the three-dimensional object is printed, the three-dimensional object being printed by sequentially stacking a plurality of layers of the three-dimensional object along a Z-axis, the three-dimensional object preview device comprising:

a processor; and a memory connected to the processor; wherein the processor is configured or programmed to:

divide the three-dimensional object whose shape is represented by initial three-dimensional data into a plurality of layers continuous along the Z-axis, thus generating cross-sectional image data representing a cross-sectional shape of each of the layers of the three-dimensional object;

acquire first two-dimensional coordinate data from the cross-sectional image data of each of the layers of the three-dimensional object, the first two-dimensional coordinate data being defined by coordinates of X and Y axes each perpendicular or substantially perpendicular to the Z-axis;

convert, using triangulation, the first two-dimensional coordinate data into second two-dimensional coordinate data of each of the layers of the three-dimensional object, the second two-dimensional coordinate data including a plurality of triangles;

add Z-axis coordinate information to the second two-dimensional coordinate data of each of the layers of the three-dimensional object, thus generating three-dimensional coordinate data of each of the layers of the three-dimensional object;

add layer thickness information to the three-dimensional coordinate data of each of the layers of the three-dimensional object, thus generating layer image data representing a three-dimensional model for each of the layers of the three-dimensional object;

generate, using the layer image data of each of the layers of the three-dimensional object, printing image data representing a three-dimensional model for a portion or an entirety of the three-dimensional object; and cause the display device to display the three-dimensional model represented by the printing image data; wherein the three-dimensional object includes;
a target object; and
a support object configured to support the target object when the target object is printed; and the processor is further configured or programmed to:

generate initial three-dimensional data representing a shape of the support object from initial three-dimensional data representing a shape of the target object;

divide the target object into a plurality of layers continuous along the Z-axis, thus generating cross-sectional image data representing a cross-sectional shape of each of the layers of the target object;

divide the support object into a plurality of layers continuous along the Z-axis, thus generating cross-sectional image data representing a cross-sectional shape of each of the layers of the support object;

acquire first two-dimensional coordinate data of the target and support objects from the cross-sectional image data of each of the layers of the target and support objects, the first two-dimensional coordinate data being defined by X-axis and Y axis coordinates;

convert, using triangulation, the first two-dimensional coordinate data of the target and support objects into second two-dimensional coordinate data of each of the layers of the target and support objects, the second two-dimensional coordinate data including a plurality of triangles;

add Z-axis coordinate information to the second two-dimensional coordinate data of each of the layers of the target and support objects, thus generating three-dimensional coordinate data of each of the layers of the target and support objects;

add layer thickness information to the three-dimensional coordinate data of each of the layers of the target and support objects, thus generating layer image data representing a three-dimensional model for each of the layers of the target and support objects;

generate, using the layer image data of each of the layers of the target and support objects, printing image data representing a three-dimensional model for a portion or an entirety of the target object, and a three-dimensional model for a portion or an entirety of the support object; and cause, using the printing image data, the display device to selectively display one of the three-dimensional model for a portion or an entirety of the target object, and the three-dimensional model for a portion or an entirety of the support object.

2. The three-dimensional object preview device according to claim 1, wherein the processor is further configured or programmed to generate at least one of:

first printing image data representing a three-dimensional model for one of the layers of the three-dimensional object;

second printing image data representing a three-dimensional model for a plurality of continuous layers included in the layers of the three-dimensional object; and third printing image data representing a three-dimensional model for all of the layers of the three-dimensional object.

3. The three-dimensional object preview device according to claim 1, wherein the processor is further configured or programmed to cause the display device to selectively display one of the three-dimensional model represented by the printing image data, and a three-dimensional model represented by the initial three-dimensional data.

4. A three-dimensional printing apparatus comprising the three-dimensional object preview device according to claim 1.

5. The three-dimensional printing apparatus according to claim 4, the apparatus further comprising:

a discharge head configured to discharge photo-curable resin and cure the discharged photo-curable resin;

a table configured to receive the photo-curable resin discharged from the discharge head; and a mover configured to move the discharge head relative to the table along the X-axis, Y-axis, and Z-axis.

6. A three-dimensional object preview method for causing a display device to display a three-dimensional object before the three-dimensional object is printed, the three-dimensional object being printed by sequentially stacking a plurality of layers of the three-dimensional object along a Z-axis, the method comprising steps of:

(a) dividing the three-dimensional object whose shape is represented by initial three-dimensional data into a plurality of layers continuous along the Z-axis, thus generating cross-sectional image data representing a cross-sectional shape of each of the layers of the three-dimensional object;

(b) acquiring first two-dimensional coordinate data from the cross-sectional image data of each of the layers of the three-dimensional object, the first two-dimensional coordinate data being defined by coordinates of X and Y axes each perpendicular or substantially perpendicular to the Z-axis;

(c) converting, using triangulation, the first two-dimensional coordinate data into second two-dimensional coordinate data of each of the layers of the three-dimensional object, the second two-dimensional coordinate data including a plurality of triangles;

(d) adding Z-axis coordinate information to the second two-dimensional coordinate data of each of the layers of the three-dimensional object, thus generating three-dimensional coordinate data of each of the layers of the three-dimensional object;

(e) adding layer thickness information to the three-dimensional coordinate data of each of the layers of the three-dimensional object, thus generating layer image data representing a three-dimensional model for each of the layers of the three-dimensional object;

(f) generating, using the layer image data of each of the layers of the three-dimensional object, printing image data representing a three-dimensional model for a portion or an entirety of the three-dimensional object; and (g) causing the display device to display the three-dimensional model represented by the printing image data; wherein the three-dimensional object includes:
a target object; and
a support object configured to support the target object when the target object is printed;

step (a) includes:
generating initial three-dimensional data representing a shape of the support object from initial three-dimensional data representing a shape of the target object;
dividing the target object into a plurality of layers continuous along the Z-axis, thus generating cross-sectional image data representing a cross-sectional shape of each of the layers of the target object; and
dividing the support object into a plurality of layers continuous along the Z-axis, thus generating cross-sectional image data representing a cross-sectional shape of each of the layers of the support object;

step (b) includes acquiring first two-dimensional coordinate data of the target and support objects from the cross-sectional image data of each of the layers of the target and support objects, the first two-dimensional coordinate data being defined by X-axis and Y axis coordinates;

step (c) includes converting, using triangulation, the first two-dimensional coordinate data of the target and support objects into second two-dimensional coordinate data of each of the layers of the target and support objects, the second two-dimensional coordinate data including a plurality of triangles;

step (d) includes adding Z-axis coordinate information to the second two-dimensional coordinate data of each of the layers of the target and support objects, thus generating three-dimensional coordinate data of each of the layers of the target and support objects;

step (e) includes adding layer thickness information to the three-dimensional coordinate data of each of the layers of the target and support objects, thus generating layer image data representing a three-dimensional model for each of the layers of the target and support objects;

step (f) includes generating, using the layer image data of each of the layers of the target and support objects, printing image data representing a three-dimensional model for a portion or an entirety of the target object, and a three-dimensional model for a portion or an entirety of the support object; and step (g) includes causing, using the printing image data, the display device to selectively display one of the three-dimensional model for a portion or an entirety of the target object, and the three-dimensional model for a portion or an entirety of the support object.

7. The three-dimensional object preview method according to claim 6, wherein step (f) includes generating at least one of:
first printing image data representing a three-dimensional model for one of the layers of the three-dimensional object;
second printing image data representing a three-dimensional model for continuous layers included in the layers of the three-dimensional object; and
third printing image data representing a three-dimensional model for all of the layers of the three-dimensional object.

8. The three-dimensional object preview method according to claim 6, wherein step (g) includes causing the display device to selectively display one of the three-dimensional model represented by the printing image data, and a three-dimensional model represented by the initial three-dimensional data.

9. A three-dimensional object preview device that causes a display device to display a three-dimensional object before the three-dimensional object is printed, the three-dimensional object being printed by sequentially stacking a plurality of layers of the three-dimensional object along a Z-axis, the three-dimensional object preview device comprising:
a processor; and
a memory connected to the processor; wherein
the processor is configured or programmed to:
divide the three-dimensional object whose shape is represented by initial three-dimensional data into a plurality of layers continuous along the Z-axis, thus generating cross-sectional image data representing a cross-sectional shape of each of the layers of the three-dimensional object;
acquire first two-dimensional coordinate data from the cross-sectional image data of each of the layers of the three-dimensional object, the first two-dimensional coordinate data being defined by coordinates of X and Y axes each perpendicular or substantially perpendicular to the Z-axis;
convert, using triangulation, the first two-dimensional coordinate data into second two-dimensional coordinate data of each of the layers of the three-dimensional object, the second two-dimensional coordinate data including a plurality of triangles;
add Z-axis coordinate information to the second two-dimensional coordinate data of each of the layers of the three-dimensional object, thus generating three-dimensional coordinate data of each of the layers of the three-dimensional object;
add layer thickness information to the three-dimensional coordinate data of each of the layers of the three-dimensional object, thus generating layer image data representing a three-dimensional model for each of the layers of the three-dimensional object;
generate, using the layer image data of each of the layers of the three-dimensional object, printing image data representing a three-dimensional model for a portion or an entirety of the three-dimensional object; and
cause the display device to display the three-dimensional model represented by the printing image data, wherein
the three-dimensional object includes:
a target object; and
a support object configured to support the target object when the target object is printed; and
the processor is further configured or programmed to:
generate initial three-dimensional data representing a shape of the support object from initial three-dimensional data representing a shape of the target object;
divide the target object into a plurality of layers continuous along the Z-axis, thus generating cross-sectional image data representing a cross-sectional shape of each of the layers of the target object;
divide the support object into a plurality of layers continuous along the Z-axis, thus generating cross-sectional image data representing a cross-sectional shape of each of the layers of the support object;
acquire first two-dimensional coordinate data of the target and support objects from the cross-sectional image data of each of the layers of the target and support objects, the first two-dimensional coordinate data being defined by X-axis and Y axis coordinates;

convert, using triangulation, the first two-dimensional coordinate data of the target and support objects into second two-dimensional coordinate data of each of the layers of the target and support objects, the second two-dimensional coordinate data including a plurality of triangles;

add Z-axis coordinate information to the second two-dimensional coordinate data of each of the layers of the target and support objects, thus generating three-dimensional coordinate data of each of the layers of the target and support objects;

add layer thickness information to the three-dimensional coordinate data of each of the layers of the target and support objects, thus generating layer image data representing a three-dimensional model for each of the layers of the target and support objects;

generate, using the layer image data of each of the layers of the target and support objects, printing image data representing a three-dimensional model for a portion or an entirety of the target object, and a three-dimensional model for a portion or an entirety of the support object; and cause, using the printing image data, the display device to selectively display one of the three-dimensional model for a portion or an entirety of the target and support objects, and the three-dimensional model for a portion or an entirety of the target object.

10. The three-dimensional object preview device according to claim 9, wherein the processor is further configured or programmed to generate at least one of:

first printing image data representing a three-dimensional model for one of the layers of the three-dimensional object;

second printing image data representing a three-dimensional model for a plurality of continuous layers included in the layers of the three-dimensional object; and third printing image data representing a three-dimensional model for all of the layers of the three-dimensional object.

11. The three-dimensional object preview device according to claim 9, wherein the processor is further configured or programmed to cause the display device to selectively display one of the three-dimensional model represented by the printing image data, and a three-dimensional model represented by the initial three-dimensional data.

12. A three-dimensional printing apparatus comprising the three-dimensional object preview device according to claim 9.

13. A three-dimensional object preview device that causes a display device to display a three-dimensional object before the three-dimensional object is printed, the three-dimensional object being printed by sequentially stacking a plurality of layers of the three-dimensional object along a Z-axis, the three-dimensional object preview device comprising:

a processor; and a memory connected to the processor; wherein the processor is configured or programmed to:

divide the three-dimensional object whose shape is represented by initial three-dimensional data into a plurality of layers continuous along the Z-axis, thus generating cross-sectional image data representing a cross-sectional shape of each of the layers of the three-dimensional object;

acquire first two-dimensional coordinate data from the cross-sectional image data of each of the layers of the three-dimensional object, the first two-dimensional coordinate data being defined by coordinates of X and Y axes each perpendicular or substantially perpendicular to the Z-axis;

convert, using triangulation, the first two-dimensional coordinate data into second two-dimensional coordinate data of each of the layers of the three-dimensional object, the second two-dimensional coordinate data including a plurality of triangles;

add Z-axis coordinate information to the second two-dimensional coordinate data of each of the layers of the three-dimensional object, thus generating three-dimensional coordinate data of each of the layers of the three-dimensional object;

add layer thickness information to the three-dimensional coordinate data of each of the layers of the three-dimensional object, thus generating layer image data representing a three-dimensional model for each of the layers of the three-dimensional object;

generate, using the layer image data of each of the layers of the three-dimensional object, printing image data representing a three-dimensional model for a portion or an entirety of the three-dimensional object; and cause the display device to display the three-dimensional model represented by the printing image data, wherein the processor is further configured or programmed to:

generate first printing image data representing a three-dimensional model for one of the layers of the three-dimensional object;

generate second printing image data representing a three-dimensional model for continuous layers included in the layers of the three-dimensional object;

generate third printing image data representing a three-dimensional model for all of the layers of the three-dimensional object; and cause, using the first, second, and third printing image data, the display device to selectively display one of the three-dimensional model for one of the layers of the three-dimensional object, the three-dimensional model for continuous layers included in the layers of the three-dimensional object, and the three-dimensional model for all of the layers of the three-dimensional object.

14. The three-dimensional object preview device according to claim 13, wherein the processor is further configured or programmed to cause the display device to selectively display one of the three-dimensional model represented by the printing image data, and a three-dimensional model represented by the initial three-dimensional data.

15. A three-dimensional printing apparatus comprising the three-dimensional object preview device according to claim 13.

* * * * *